April 23, 1940.
L. C. RUBIN
2,198,180
CONVERSION OF HYDROCARBONS
Filed June 1, 1939
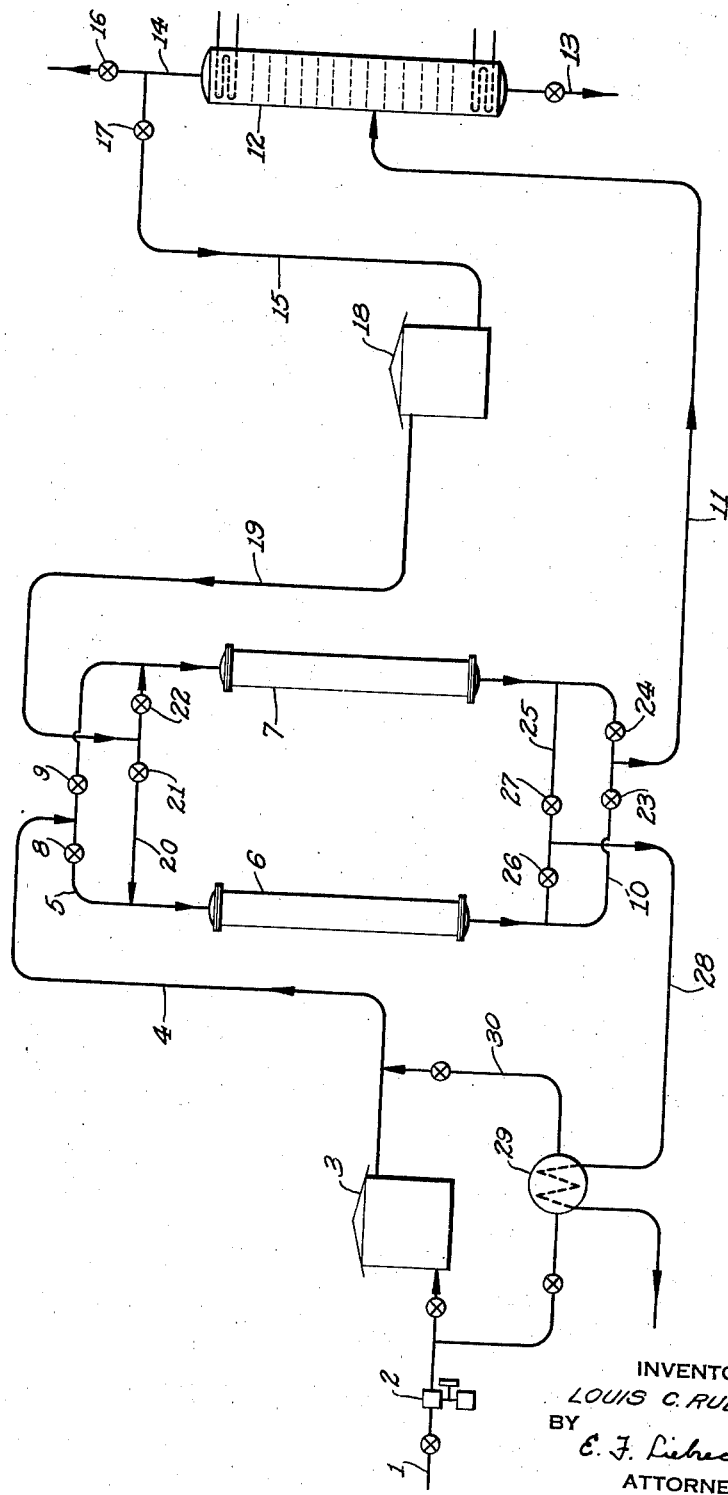
INVENTOR
*LOUIS C. RUBIN*
BY
*E. F. Liebrecht*
ATTORNEY Patented Apr. 23, 1940

2,198,180

UNITED STATES PATENT OFFICE 2,198,180

CONVERSION OF HYDROCARBONS

Louis C. Rubin, West Caldwell, N. J., assignor to The Polymerization Process Corporation, Jersey City, N. J., a corporation of Delaware Application June 1, 1939, Serial No. 276,835

4 Claims. (Cl. 196—10)

This invention relates to the polymerization of olefins to higher boiling hydrocarbons. More particularly, the invention relates to the conversion of normally gaseous olefins, particularly propylenes and butylenes, to polymers within the gasoline boiling range. Still more particularly, the invention relates to a process for the treatment of such gaseous olefins by contact thereof at elevated conditions of temperature and pressure with a catalyst comprising as an essential ingredient a metal pyrophosphate.

Certain pyrophosphates including those of copper, zinc, magnesium, iron, aluminum and cobalt are capable of promoting the polymerization of olefins but it has been found necessary to pass the hydrocarbons under treatment over the catalytic material containing the pyrophosphate for some time at elevated temperature in order to initiate the conversion of olefins to polymer products. Apparently the pyrophosphate is activated by the production therein of a modification containing the active centers for accelerating polymerization of olefins. The active modification of the pyrophosphate probably is formed by reduction such as reduction of the copper of copper pyrophosphate from the cupric to the cuprous state to form acid cuprous pyrophosphate. The length of time and the temperature necessary for this activation period depends somewhat upon the method by which the pyrophosphate is produced. If, in the production of certain metal pyrophosphates by reaction of a soluble phosphate such as sodium pyrophosphate and a soluble metal salt an excess of the pyrophosphate is employed it is found that the resulting product is stabilized against reduction to the active modification. Probably this results from the formation of a double salt of sodium pyrophosphate and the metal pyrophosphate which acts as a reduction inhibitor. Under these conditions is is necessary, in order to activate the catalyst, to subject the catalytic mass to temperatures during the activation period which may be substantially higher than those desired for the polymerization reaction. For example, it may be desired to carry out the polymerization reaction at a temperature of 350° F. while it may be necessary to pass the hydrocarbon mixture under treatment over the catalytic mass at a higher temperature in order to initiate the conversion of olefins. When copper pyrophosphate contact agent is prepared utilizing sodium pyrophosphate in an amount which is 10 per cent in excess of the amount equivalent to copper sulfate according to the reaction $$2CuSO_4 + Na_4P_2O_7 \rightarrow Cu_2P_2O_7 + 2Na_2SO_4$$

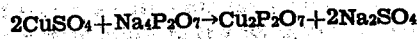

the presence of the double salt which is contained in the resulting product necessitates passing the olefinic mixture under treatment over the contact agent for a period of as much as fifty hours while raising the temperature to 500° F. in order to initiate conversion of the olefins to polymer products. Thereafter the desired lower operating temperature may be employed.

It is believed that during the active life of a contact agent reduction is continuous with the gradual production of the active material. The reduction products formed originally appear to act as nuclei which promote the reduction of additional material. For example, the reduction products formed at the high activating temperature mentioned above act to promote the reduction of additional material at the lower operating temperature since it is found that no loss of conversion rate results from reduction of the temperature from the high activating temperature to the lower polymerizing temperature.

If an excess of the sodium pyrophosphate is avoided in the preparation of the catalytic material whereby it does not contain the double salt, it is found that the activation period necessary is shortened, and it may not be necessary to raise the temperature during the activation period substantially above the desired polymerization reaction temperature. However, it may be desirable to form the double salt in the copper pyrophosphate when the latter is to be used under certain conditions of operation since, in its absence, the catalytic material may under some circumstances reduce more rapidly to the active modification than required for the continuance of the polymerizing reaction at a steady rate. Under these conditions the contact agent soon loses its mechanical form and exhibits a relatively short active life. As an example of the use of catalytic material containing the stabilized, or reduction inhibitor, it may be desired to operate at high temperatures on a gaseous feed of low olefin content or one containing refractory olefins such as ethylene. Under these conditions a highly stabilized catalytic material is desirable since the reduction conditions are quite severe and might otherwise cause the material to become reduced too rapidly for continuance of the polymerizing reaction at a steady rate.

The initiation of the polymerizing activity of the metal pyrophosphate by the passage thereover of the olefinic gas under treatment results in undesirable waste of gases containing substantial proportions of convertible constituents during the activation period. Furthermore, the employment of temperatures higher than the reaction temperature during the activation period, if necessary, requires periodically raising the temperature to which the reaction gases are heated above the temperature to which they are normally heated for the polymerization reaction. This necessitates the provision of heating capacity for the reaction gases in excess of that normally required for the reaction and in addition results in uneven operation.

In connection with the present invention it has been found that the use of the olefin-rich fresh feed gases for activating the catalytic material can be avoided and that activation can be effected by means of a gaseous mixture having an olefin content which while appreciable is substantially lower than that of the gases, relatively rich in olefins, which are ordinarily suitable for polymerization treatment. Apparently activation is effected by the olefins present as they are the most reactive constituents of the mixture in the gases. For example, the unconverted gaseous portion of the polymerization reaction product is suitable for this purpose, particularly unconverted gases from a selective polymerization treatment since they contain at least 10 per cent of olefins and are therefore more desirable for the purpose than tail gases containing a lower proportion of olefins.

The present invention contemplates a polymerization treatment of gaseous olefins to effect conversion thereof to gasoline constituents in a plurality of catalytic reactors whereby the hydrocarbon stream under conversion treatment continuously passes through one or more of the reactors. The catalytic material eventually has its activity reduced by the deposition of carbonaceous material upon the active centers. In order to maintain the activity of the catalytic material in contact with the gaseous stream it is necessary to remove the reactor of lowest activity periodically from the hydrocarbon stream and replace it with a fresh reactor containing catalytic material of high activity. The relatively spent catalytic material in the reactor which is thus removed from the hydrocarbon stream is replaced with fresh material. Thereafter the reactor is returned to the hydrocarbon stream in place of one whose activity has been substantially lowered in the meantime. However, before it is returned to the hydrocarbon stream the catalytic material contained in the reactor is activated by the passage thereover of preheated olefinic hydrocarbon mixture. This hydrocarbon mixture is generally similar in boiling range to the hydrocarbon stream under treatment and is obtained by separating from the products of polymerization the high-boiling polymer product. Passage of the preheated hydrocarbon stream through the reactor is continued until the catalytic material is activated, as evidenced by the initiation of polymerization. Then the reactor is returned to the hydrocarbon stream under treatment in place of another reactor which has had its activity reduced in the meantime.

The invention will be described in more detail with reference to the accompanying drawing which is a flow diagram illustrating the operation of the invention as applied to a system employing two reactors. It is to be understood, however, that the invention is not limited to such a system but on the contrary, for reasons which will be discussed below, is of broader application and preferably is employed in connection with a hydrocarbon treatment involving the use of many reactors such as the passage of a single hydrocarbon stream successively through a multiplicity of reactors or the passage of a plurality of hydrocarbon streams each through a plurality of reactors.

Referring to the drawing, a hydrocarbon stream, such as a gaseous mixture, containing a substantial proportion of olefins is introduced into the system through line 1. The gaseous stream is raised to the operating pressure by means of compressor 2 and is raised to the operating temperature by passage through a heater 3. From heater 3 the preheated gaseous mixture passes through line 4 to a header 5 which connects with reactors 6 and 7. Header 5 is provided with valves 8 and 9 whereby distribution of the gaseous stream to either of reactors 6 and 7 may be effected.

Reactors 6 and 7 connect with a second header 10, provided with valves 23 and 24, through which the reaction products may be withdrawn. Header 10 is connected by line 11 with a fractionator 12 in which the reaction products are fractionated to separate the polymer product from the unconverted low-boiling material contained therein.

The polymer product is withdrawn from fractionator 12 through line 13, and the unconverted low-boiling material is withdrawn through line 14 from the upper portion of fractionator 12.

A portion of the unconverted low-boiling material may be diverted from line 14 through line 15. Valves 16 and 17 are provided in lines 14 and 15, respectively, to provide control of the distribution of the unconverted material. Line 15 connects with a heater 18 in which the unconverted hydrocarbon material may be raised to the desired temperature. The hydrocarbon mixture thus preheated in heater 18 is withdrawn therefrom through line 19 which connects with a header 20. Header 20, in turn, connects with header 5 at a point between valve 8 and reactor 6 and at a point between valve 9 and reactor 7. Header 20 is provided with valves 21 and 22 to effect distribution of the hydrocarbon mixture from line 19 to the reactor which is not in the hydrocarbon stream undergoing treatment. The low olefin content hydrocarbon mixture employed in activating the catalytic material in the reactor which is not in the gaseous stream under treatment is removed through header 25 which connects with header 10 at a point between reactor 6 and valve 23 and at a point between reactor 7 and valve 24. Header 25 is provided with valves 26 and 27 and is connected at a point between said valves with line 28. Line 28 is provided for withdrawal from the system of the hydrocarbon mixture used for activation. Optionally line 28 may connect with heat exchanger 29 for preheating all or a part of the hydrocarbon stream in line 1. Heat exchanger 29 is located in line 30 which connects with line 1 and line 4 to by-pass heater 3.

In the operation of the process of the invention in accordance with the method illustrated by the drawing a hydrocarbon gas containing a substantial proportion of olefins, preferably those having three and four carbon atoms per molecule, is introduced through line 1 and raised to the operating pressure by means of compressor 2. Any desirable operating pressure may be used, but normally it is advantageous to use a pressure of 700 pounds per square inch or higher. In heater 3, or in heat exchanger 29, or both, the temperature of the hydrocarbon gas is raised to the operating temperature of, for example, 350° to 400° F. The preheated hydrocarbon gas passes from heater 3 through line 4 to header 5. Assuming that reactor 6 is in use, valve 8 in header 5 will be open, and valve 9 will be closed so that the hydrocarbon gas from line 4 passes through reactor 6. Reactor 6 is provided with a granular body of catalytic material containing a metal pyrophosphate and an active modification thereof. The rate of flow of the hydrocarbon gas through reactor 6 is controlled to maintain the gases in contact with the catalytic body for a time sufficient to effect the desired polymerization of the olefins. If the hydrocarbon gas contains a substantial proportion of isobutylene, and if it is desired to effect selective polymerization of the isobutylene the time of contact of hydrocarbon gas on the catalytic material is limited to effect polymerization of isobutylene and any desired proportion of the normal olefins present. In any case the olefin content of the hydrocarbon gas will be reduced sharply by the polymerization treatment in reactor 6. For example, a hydrocarbon gas having an olefin content of 50 per cent by weight may have the olefin content thereof reduced to approximately 10 per cent by polymerization of the remaining olefin content to liquid products.

The mixture of polymers and unreacted gases passes from reactor 6 into header 10. Valve 23 in header 10 is open while valve 24 is closed whereby the mixture of polymers and gases flows from header 10 into line 11 by which the mixture is transferred to fractionator 12.

In fractionator 12 the mixture of polymers and unreacted gases is fractionated to separate the mixture into a liquid fraction containing the polymers and a gaseous fraction containing the unconverted gases which are undesired in the liquid product. The liquid product is withdrawn through line 13, and the gases are withdrawn through line 14.

After the activity of the catalytic material in reactor 6 has been lowered substantially, for example, by the deposition of carbonaceous materials on the active centers of the catalyst the flow of the hydrocarbon gas from line 4 may be transferred to reactor 7. This is effected by opening valves 9 and 24 and closing valves 8 and 23. Thereafter the polymerization treatment continues in the manner described above with the substitution of reactor 7 in place of reactor 6, reactor 7 being provided with a granular catalytic mass similar to that of the reactor 6.

During the period in which the gases flow through reactor 7 the activity of the reactor 6 is restored by replacing the catalytic material contained therein.

After such replacement of the deactivated catalytic material with fresh material the catalytic mass contained in reactor 6 is subjected to treatment in accordance with the present invention to initiate the polymerizing activity of the catalytic material. For this purpose a portion or all of the gases withdrawn from fractionator 12 through line 14 are diverted through line 15, valves 16 and 17 being provided to effect the diversion of the desired proportion of the gases. These gases, which contain a reduced proportion of olefins, are preheated to elevated temperature, for example, 300° to 600° F. by passage through a heater 18 or other suitable heat exchange means. From heater 18 the preheated low olefin gases are withdrawn through line 19 which connects with a header 20 which in turn connects with header 5 at a point between valve 8 and reactor 6 and at a point between valve 9 and reactor 7. With reactor 7 in use the low olefin gases from line 19 are directed to header 5 at the point between valve 8 and reactor 6 by having valve 22 closed and valve 21 open. The low olefin gases thereby are passed through reactor 6 at elevated temperature in order to bring the body of catalytic material to the desired temperature for the polymerizing reaction and also to effect the initiation of the polymerizing activity of the metal pyrophosphate by reduction thereof to the active modification. After passage of the low olefin gases through reactor 6 they are withdrawn through header 10 and diverted therefrom through header 25 and line 26, valves 23 and 27 being closed.

The pressure maintained during the passage of the low olefin gases through reactor 6 may be that of fractionator 12 or lower, or the pressure in reactor 6 may be maintained higher than that of fractionator 12 by the inclusion of a compressor in line 15.

Under some circumstances it may be desirable to pass the products from reactor 6 during the activation treatment thereof to fractionator 12 along with the products of reaction from reactor 7 which is on stream. Under these circumstances header 25 would not be used, and valve 23 would be open. Pressure means, such as a compressor in line 15, would be provided to effect the desired recirculation of the low olefin gases. This operation may be employed when it is desired to recover in fractionator 12 the small amount of polymer products which are formed in the low olefin content gas during the activation treatment.

The invention has been described with reference to relatively simple apparatus for purposes of illustration. It will be understood, however, that the process in commercial application thereof ordinarily will employ more than two reactors. In fact for smooth operation of the process it is desirable to employ a sufficient number of reactors so that a plurality of reactors will undergo replacement of catalytic material and activation. By this method of operation at least one reactor is in the process of activation at all times so that there is a continuous diversion of a portion of the low olefin content gases from line 14 for use as an activating medium. Under this method of operation there will be produced continuously from a reactor undergoing activation treatment a stream of gases of low olefin content and containing a small proportion of polymer products. Such material may be returned to the fractionator for recovery of the polymer products or may be diverted from the system for further treatment elsewhere for recovery of the polymer products.

It is thus seen that the present invention provides a polymerization process employing a metal pyrophosphate catalytic material wherein activation of the various bodies of catalytic material employed is effected without the use of the fresh feed to the process. Consequently the conversion of the fresh feed to the reactors to polymer products is maintained at a substantially uniform rate without the sudden loss of conversion rate which would follow discontinuing the passage of an olefinic gas under polymerizing conditions through a relatively active catalytic mass and initiating passage of said olefinic gas through a catalytic mass containing a metal pyrophosphate as the essential ingredient and which had not been treated previously to initiate the polymerizing activity of the pyrophosphate.

I claim:

1. A process for treating a hydrocarbon mixture relatively rich in olefins to effect polymerization of said olefins which comprises passing said hydrocarbon mixture over a catalytic mass containing a metal pyrophosphate which has been reduced at least in part to a modification containing active centers for accelerating polymerization of olefins, contact of said hydrocarbon mixture and said catalytic mass being brought about under conditions of temperature, pressure and time effective to produce substantial polymerization of said olefins to higher boiling products, separating from the products of said polymerization reaction a relatively high-boiling polymer product and a relatively low-boiling hydrocarbon mixture containing unpolymerized constituents of said reaction products and having an olefin content which is appreciable but substantially lower than that of said first-mentioned hydrocarbon mixture, passing said last-mentioned hydrocarbon mixture at elevated temperature over a second catalytic mass containing a metal pyrophosphate not reduced to an active modification, continuing passage of said hydrocarbon mixture over said second catalytic mass at elevated temperature for a time sufficient to effect reduction of a portion of the metal pyrophosphate content thereof to the active modification and initiate polymerization of olefins, then discontinuing passage of said hydrocarbon mixture of reduced olefin content over said second catalytic mass and initiating passage thereover of a hydrocarbon mixture relatively rich in olefins under the said polymerizing conditions of temperature, pressure and time.

2. A process in accordance with claim 1 wherein said hydrocarbon mixture of low olefin content has an olefin content of at least 10 per cent by weight.

3. A process in accordance with claim 1 wherein said hydrocarbon mixture undergoing treatment consists essentially of $C_3$ and $C_4$ hydrocarbons including $C_3$ and $C_4$ olefins.

4. A process in accordance with claim 1 wherein contact of said hydrocarbon mixture of low olefin content with said catalytic mass which is not reduced to the active modification is effected at a temperature substantially higher than that of said polymerizing treatment.

LOUIS C. RUBIN.